Sept. 16, 1952  O. L. DUNLAP  2,610,510
MOTION CONVERTER
Filed Jan. 7, 1950
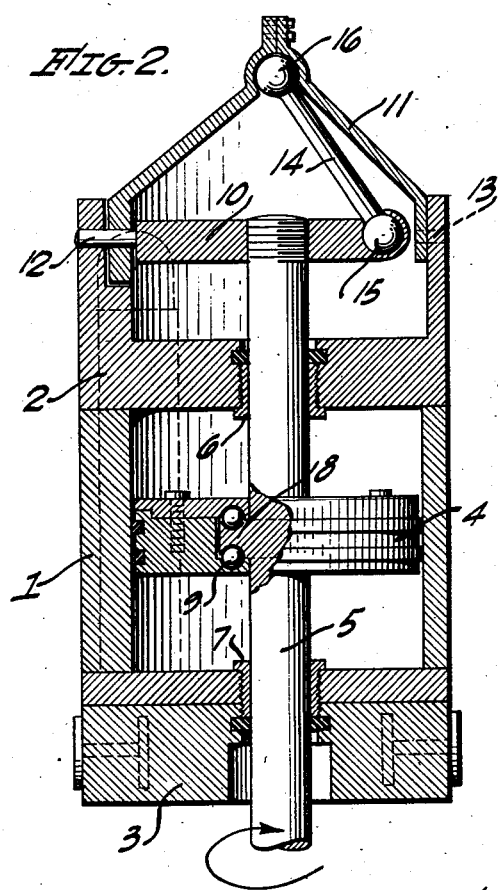
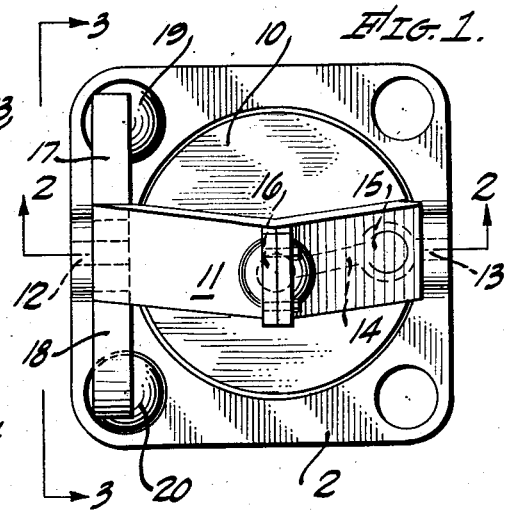
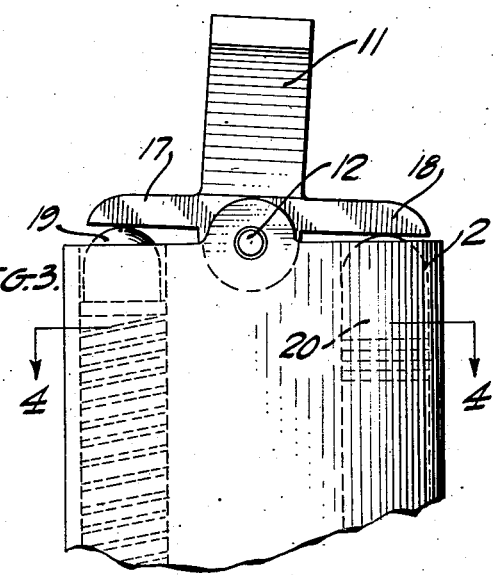
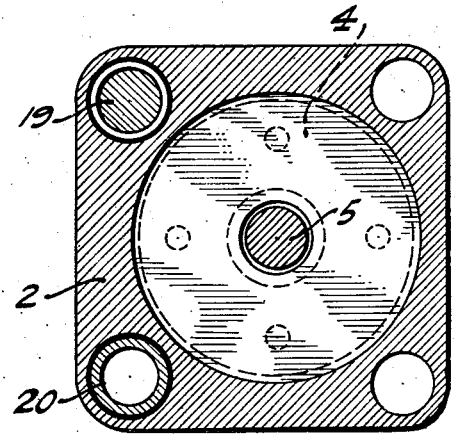
INVENTOR.
OLLEN L. DUNLAP,
BY
ATTORNEY.

Patented Sept. 16, 1952

2,610,510

UNITED STATES PATENT OFFICE 2,610,510

MOTION CONVERTER

Ollen L. Dunlap, Long Beach, Calif.

Application January 7, 1950, Serial No. 137,415

5 Claims. (Cl. 74—22)

1

This invention relates to a motion converter whereby a shaft is reciprocated by the action of an eccentrically positioned link which engages the rotating shaft on which the motion converter is mounted.

An object of my invention is to provide a novel motion converter in which the link which serves to reciprocate the shaft is moved to an eccentric position in a novel and effective manner.

Still another object of my invention is to provide a novel means of mounting the piston on the rotating shaft so that the piston will not rotate with the shaft.

Still another object of my invention is to provide a novel means of shifting the link by means of a hydraulically operated piston.

Other objects, advantages and features of invention may appear from the accompanying drawing, the subjoined detailed description and the appended claims.

In the drawing:

Figure 1 is a top plan view of my motion converter.

Figure 2 is a sectional view taken on line 2—2 of Figure 1.

Figure 3 is a fragmentary side elevation taken from the line 3—3 of Figure 1.

Figure 4 is a transverse sectional view taken on line 4—4 of Figure 3.

Referring more particularly to the drawing, the numeral 1 indicates a cylinder, comprising a cup-shaped end 2, and a lower end 3, closing the ends of said cylinder. A piston 4 is reciprocally mounted in the cylinder 1, and this piston is mounted on a shaft 5, which extends through the cylinder 1 and the ends 2—3. This shaft is continuously rotated from a suitable source of power, not shown. Suitable packing glands 6 and 7 are provided in the ends 2—3, respectively, and surround the shaft 5 to prevent leakage past this shaft.

A shoulder 8 is either integrally formed on the shaft 5, or is fixedly attached to this shaft, and this shoulder is positioned within the piston 4, as shown. A thrust bearing 9 is provided on each side of the shoulder 8, thus providing an antifriction bearing between the shoulder 8 and the piston 4, thus permitting the piston 4 to remain stationary while the shaft 5 is rotating. A plate 10 is fixedly secured to the upper end of the shaft 5 and is positioned within the cup 2, substantially as shown. A shiftable stirrup 11 is pivotally secured to the cup 2, by means of the pins 12—13.

A link 14 is secured to the plate 10 by means of the ball joint 15, and to the stirrup 11 by means

2 of the ball joint 16. These ball joints can be universal joints, if desired. As long as the joint 16 is in axial alignment of the shaft 5, there will be reciprocating movement of this shaft, however, if the joint 16 is eccentric to the center line of the shaft 5 (as shown in Figure 1), then the shaft 5 will be reciprocated, and the amount of reciprocation will be determined by the amount of eccentricity of the joint 16, from the center line of the shaft 5.

The stirrup 11 may be provided with oppositely positioned fingers 17—18, and the finger 17 is engaged by a spring pressed plunger 19, while the finger 18 is engaged by the hydraulically actuated piston 20. Thus, by applying hydraulic pressure to the piston 20, it is possible to shift the stirrup 11, as desired, and the amount of tilt of the stirrup 11 will determine the stroke of the piston 4.

In operation, the shaft 5 is continuously rotated by a suitable motor. The eccentrically positioned link 14 will reciprocate the shaft 5 and the piston 4 within the cylinder 1. Suitable fluid ports, which are usual and well known in the art, enable fluid to pass into and out of the cylinder 1, and these fluids are pumped by the piston 4, in the usual and well known manner. By controlling fluid pressure on the piston 20, it is possible to tilt the stirrup 11, as desired, while the pump is in action.

Having described my invention, I claim:

1. A motion converter comprising a cylinder, a shaft extending axially through the cylinder, means journalling the shaft in the cylinder, means to continuously rotate said shaft, a plate on the outer end of the shaft, a stirrup, means pivotally mounting the stirrup on one end of said cylinder, a link journalled in said stirrup and said plate, said link being eccentrically positioned relative to the center line of said shaft, and hydraulically actuated means engaging said stirrup to tilt the same relative to the center line of said shaft.

2. A motion converter comprising a cylinder, a shaft extending axially through the cylinder, means journalling the shaft in the cylinder, means to continuously rotate said shaft, a plate on the outer end of the shaft, a stirrup, means pivotally mounting the stirrup on one end of said cylinder, a link journalled in said stirrup and said plate, said link being eccentrically positioned relative to the center line of said shaft, and hydraulically actuated means engaging said stirrup to tilt the same relative to the center line of said shaft, and a spring engaging the stirrup and opposing the pressure of said hydraulic piston.

3. A motion converter comprising a cylinder, a shaft extending axially through the cylinder, means journalling the shaft in the cylinder, means to continuously rotate said shaft, a plate fixedly mounted on one end of said shaft, a stirrup pivotally mounted on one end of said cylinder and adjacent the plate, a link journalled in said stirrup and said plate, said link being eccentrically positioned relative to the center line of said shaft, oppositely projecting fingers extending from the stirrup and means engaging one of said fingers to tilt the stirrup relative to the center line of said shaft.

4. A motion converter comprising a cylinder, a shaft extending axially through the cylinder, means journalling the shaft in the cylinder, means to continuously rotate said shaft, a plate fixedly mounted on one end of said shaft, a stirrup pivotally mounted on one end of said cylinder and adjacent the plate, a link journalled in said stirrup and said plate, said link being eccentrically positioned relative to the center line of said shaft, oppositely projecting fingers extending from the stirrup and means engaging one of said fingers to tilt the stirrup relative to the center line of said shaft, and spring means engaging the other finger and opposing the pressure of the means engaging the first named finger.

5. A motion converter comprising a cylinder, a shaft extending axially through the cylinder, means journalling the shaft in the cylinder, means to continuously rotate said shaft, a plate fixedly mounted on one end of said shaft, a stirrup pivotally mounted on one end of said cylinder and adjacent the plate, a link journalled in said stirrup and said plate, said link being eccentrically positioned relative to the center line of said shaft, oppositely projecting fingers extending from the stirrup, and hydraulically actuated means engaging one of said fingers to tilt the stirrup relative to the center line of said shaft.

OLLEN L. DUNLAP.

REFERENCES CITED

The following references are of record in the file of this patent:

UNITED STATES PATENTS

| Number | Name | Date |
|---|---|---|
| 2,369,345 | Folke | Feb. 13, 1945 |
| 2,436,492 | Shephard | Feb. 24, 1948 |
| 2,436,493 | Shephard | Feb. 24, 1948 |

FOREIGN PATENTS

| Number | Country | Date |
|---|---|---|
| 116,462 | Germany | Dec. 27, 1900 |